(12) United States Patent
Umkehrer et al.

(10) Patent No.: US 10,794,775 B2
(45) Date of Patent: Oct. 6, 2020

(54) METHOD AND APPARATUS FOR IN SITU CALIBRATION OF A THERMOMETER

(71) Applicant: Endress+Hauser Wetzer GmbH+Co. KG, Nesselwang (DE)

(72) Inventors: Alfred Umkehrer, Hopferau (DE); Pavo Vrdoljak, Nesselwang (DE)

(73) Assignee: Endress+Hauser Wetzer GmbH+Co. KG, Nesselwang (DE)

(*) Notice: Subject to any disclaimer, the term of this patent is extended or adjusted under 35 U.S.C. 154(b) by 222 days.

(21) Appl. No.: 15/748,504

(22) PCT Filed: Jun. 28, 2016

(86) PCT No.: PCT/EP2016/064985
§ 371 (c)(1),
(2) Date: Jan. 29, 2018

(87) PCT Pub. No.: WO2017/016776
PCT Pub. Date: Feb. 2, 2017

(65) Prior Publication Data
US 2018/0217010 A1    Aug. 2, 2018

(30) Foreign Application Priority Data

Jul. 29, 2015   (DE) .......... 10 2015 112 425

(51) Int. Cl.
*G01K 11/00*   (2006.01)
*G01K 15/00*   (2006.01)
*G01K 7/38*    (2006.01)

(52) U.S. Cl.
CPC ............ *G01K 15/005* (2013.01); *G01K 7/38* (2013.01); *G01K 11/00* (2013.01); *G01K 15/002* (2013.01)

(58) Field of Classification Search
CPC ... G01J 2005/0048; G01K 7/343; G01K 3/04; G01K 15/002; G01K 15/005; G01K 7/16;
(Continued)

(56) References Cited

U.S. PATENT DOCUMENTS 3,239,783 A * 3/1966 Yetter .................. G01K 7/38
                                                    336/179
4,523,859 A    6/1985 Bonnier et al.
(Continued)

FOREIGN PATENT DOCUMENTS

CN     104316210 A    1/2015
DE       4032092 C2   6/1994
(Continued)

OTHER PUBLICATIONS

Search Report for German Patent Application No. 10 2015 112 425.4, German Patent Office, dated Sep. 15, 2016, 10 pp.
(Continued)

*Primary Examiner* — Gail Kaplan Verbitsky
(74) *Attorney, Agent, or Firm* — Kelly J. Smith; Endress+Hauser (USA) Holding Inc.

(57) ABSTRACT

An apparatus for determining and/or monitoring temperature of a medium, comprising at least one temperature sensor and at least two reference elements for in situ calibration and/or validation of the temperature sensor, wherein the first reference element is composed at least partially of a first material, in the case of which at least one phase transition of at least second order occurs at least a first predetermined phase transition temperature in the temperature range relevant for calibration of the temperature sensor, wherein the second reference element is composed at least partially of a second material, in the case of which at least one phase transition of at least second order occurs at least a second predetermined phase transition temperature in the range
(Continued)

relevant for calibration of the temperature sensor, and wherein the at least two reference elements are contacted via exactly two connection wires.

15 Claims, 2 Drawing Sheets

(58) Field of Classification Search
CPC .......... G01K 15/00; G01K 7/38; G01K 11/06; G01K 11/00; G01K 7/00; F25B 2321/002
See application file for complete search history.

(56) References Cited

U.S. PATENT DOCUMENTS

| | | | | |
|---|---|---|---|---|
| 4,902,895 | A * | 2/1990 | Hanson | G01J 5/20 |
| | | | | 250/338.2 |
| 7,677,794 | B2 | 3/2010 | Kim et al. | |
| 9,184,380 | B2 * | 11/2015 | Manaka | G01K 15/00 |
| 2012/0051389 | A1 | 3/2012 | Schalles et al. | |
| 2014/0159838 | A1 * | 6/2014 | Kuo | H01F 7/0242 |
| | | | | 335/217 |
| 2014/0361234 | A1 * | 12/2014 | Manaka | G01K 11/06 |
| | | | | 257/2 |
| 2015/0285693 | A1 * | 10/2015 | Schalles | G01K 15/002 |
| | | | | 374/1 |
| 2016/0047699 | A1 * | 2/2016 | Seefeld | G01K 7/18 |
| | | | | 374/1 |
| 2019/0353528 | A1 * | 11/2019 | Umkehrer | G01K 1/16 |
| 2019/0353529 | A1 * | 11/2019 | Schalles | G01K 3/005 |
| 2019/0360876 | A1 * | 11/2019 | Korn | G01K 7/02 |
| 2019/0360877 | A1 * | 11/2019 | Schalles | G01K 15/005 |

FOREIGN PATENT DOCUMENTS

| | | | | |
|---|---|---|---|---|
| DE | 19702140 | A1 | 7/1998 | |
| DE | 69130843 | T2 | 6/1999 | |
| DE | 19805184 | A1 | 8/1999 | |
| DE | 19941731 | A1 | 3/2001 | |
| DE | 10110131 | A1 | 9/2002 | |
| DE | 102004027072 | B3 | 2/2006 | |
| DE | 102010040039 | A1 | 3/2012 | |
| DE | 102011016612 | A1 * | 10/2012 | .......... G01K 15/002 |
| DE | 102017100264 | A1 * | 7/2018 | ............... G01K 7/34 |
| EP | 1247268 | B2 | 8/2009 | |
| JP | 2012122862 | A | 6/2012 | |
| WO | WO2014095425 | A * | 12/2012 | |
| WO | 2013113683 | A2 | 8/2013 | |

OTHER PUBLICATIONS

Search Report for International Patent Application No. PCT/EP2016/064985, WIPO, dated Jun. 28, 2016, 10 pp.

* cited by examiner

METHOD AND APPARATUS FOR IN SITU CALIBRATION OF A THERMOMETER

CROSS-REFERENCE TO RELATED APPLICATIONS

The present application is related to and claims the priority benefit of German Patent Application No. 10 2015 112 425.4, filed on Jul. 29, 2015 and International Patent Application No. PCT/EP2016/064985 filed on Jun. 28, 2016, the entire contents of which are incorporated herein by reference.

TECHNICAL FIELD

The invention relates to an apparatus for determining and/or monitoring temperature of a medium, comprising at least one temperature sensor and two reference elements for in situ calibration and/or validation of the temperature sensor. Furthermore, the invention relates to a method for in situ calibration of such an apparatus.

BACKGROUND

The calibration of thermometers is currently usually performed in calibration baths, ovens or fixed point systems. A corresponding fixed point cell is described, for example, in the patent, DE102004027072B3. However, in the case of these methods, usually the thermometer must be deinstalled from the measuring point. In order to be able to calibrate a thermometer in the installed state, in contrast, there is known from DE19941731A1 a miniaturized fixed point cell integrated in a thermometer and filled with a fixed point substance, e.g. a metal or a eutectic alloy. In this case, however, an additional cell for the encapsulation of the fixed point substance is required, a feature which lessens the dynamic range of the sensor, especially the response time to a temperature change. Moreover, it can happen in given cases that the fixed point substance escapes from the cell, which can lead to damage or even destruction of the thermometer.

It would, thus, be desirable to be able to perform a calibration and/or validation of a thermometer in the installed state, thus in situ, in the case of which the mentioned disadvantages do not occur.

In principle, the most varied of physical and/or chemical, specific, temperature dependent, material properties can be used for determining a temperature. In such case, it can either be a change of the property occurring at a certain, characteristic temperature point, especially an abrupt change of the property, or even a continuous change of the property in the form of a characteristic curve. For example, the Curie temperature of a ferromagnetic material represents a characteristic temperature point for a material. In this regard, known from DE 4032092C2 is a method for ascertaining the Curie temperature, wherein, by means of a differential scanning thermoanalyzer, an abrupt change of the amount of heat absorbed in the region of the Curie-temperature is detected. In DE19702140A1, in turn, an apparatus and a method for measuring temperature of a rotating support part are described using a temperature sensor, which has a ferro- or paramagnetic material, which exhibits in the temperature range of interest a temperature dependent change of its polarization. Thus, a characteristic curve of a temperature dependent polarization is taken into consideration for determining temperature.

A further example known from DE19805184A1 ascertains temperature of a piezoelectric element based on its capacitance. Similarly, patent DE69130843T2 concerns a method and an apparatus for determining temperature of a piezoelectric crystal oscillator.

The accessing of certain characteristic temperature points or characteristic curves is suited basically also for calibration and/or validation of thermometers.

Thus, in EP1247268B2, for example, a method is described for in situ calibration of a plurality of integrated temperature sensors based on characteristic curves of one or more reference elements in the form of secondary temperature sensors installed in a thermometer insert supplementally to a primary temperature sensor. In order that a calibration can occur, the used reference elements differ with regard to construction and/or applied material from the primary temperature sensor, resulting in different characteristic curves. Disadvantageous, in such case, however, is that usually the characteristic curves of the reference elements are subject to aging effects and/or sensor drift.

For preventing such disadvantages, known from DE102010040039A1 are an apparatus and a method for in situ calibration of a thermometer using a temperature sensor and a reference element for calibration of the temperature sensor, wherein the reference element is composed at least partially of a ferroelectric material, which experiences a phase transition at at least one predetermined temperature in the temperature range relevant for calibration of the temperature sensor. The calibration is thus based on the characteristic temperature point of a phase transition of a ferroelectric material, and is, thus, performed based on a material-specific property. Depending on the number of installed reference elements, in this way, both a so-called 1-point—as well as also a multipoint-calibration and/or validation can be performed. Since the characteristic curve of the utilized temperature sensor does not, as a rule, extend uniformly and/or linearly, at least not over the total temperature range registrable therewith, a multipoint-calibration and/or validation can normally, provide a very much more accurate adjustment of the characteristic curve of the temperature sensor using the different reference temperatures. On the other hand, an apparatus with a single reference element is distinguished by a comparatively simpler structural construction, since, for example, only one reference element must be suitably arranged and contacted.

SUMMARY

An object of the present invention, therefore, is to provide an apparatus and method, by means of which, in simple manner, a calibration and/or validation of a temperature sensor is possible over its total temperature range.

This object is achieved by an apparatus for determining and/or monitoring temperature of a medium, comprising at least one temperature sensor and at least two reference elements for in situ calibration and/or validation of the temperature sensor, wherein the first reference element is composed at least partially of a first material, in the case of which at least one phase transition of at least second order occurs at at least a first predetermined phase transition temperature in the temperature range relevant for the calibration of the temperature sensor, wherein the second reference element is composed at least partially of a second material, in the case of which at least one phase transition of at least second order occurs at at least a second predetermined phase transition temperature in the range relevant for calibration of the temperature sensor, and wherein the at least two reference elements are contacted via exactly two connection wires.

The invention relates thus to an in situ calibration and/or validation of a thermometer. A temperature sensor (primary sensor) is calibrated and/or validated with the assistance, for example, of secondary sensors (reference elements) likewise located in the thermometer insert, similarly as in the case of DE102010040039A1 (U.S. Pat. No. 9,091,601), whose disclosure is incorporated here by reference.

A phase transition of second order according to the Ehrenfest classification has a discontinuity in the second derivative of a thermodynamic variable, such as, for example, the pressure, the volume, the enthalpy, or the entropy, as a function of, for example, temperature. Phase transitions of second order concern, among other things, the transition from the ferromagnetic into the paramagnetic phase or vice versa, from the ferroelectric into the paraelectric phase or also that from a normal metal to a superconductor or vice versa. Usually, phase transitions are accompanied by a change of a certain specific material property, for example, an alteration of the crystal structure, or a change in the magnetic, electrical or dielectric properties. These material-specific changes are known for particular reference elements and can be used for a calibration and/or validation. In such case, the at least two reference elements can have one or more phase transitions, especially phase transitions in the solid phase of the applied materials. Each phase transition takes place at a certain characteristic fixed and long term stable temperature value, so that, in principle, no drift and/or no aging effects need to be taken into consideration for the reference element.

The application of at least two reference elements enables a multipoint calibration matched to the exact curve of the characteristic curve of the temperature sensor. Advantageously, the materials for the at least two reference elements can be selected in such a manner that the respective phase transition temperatures differ from one another, especially lie in sections of different slope of the characteristic curve of the temperature sensor. Depending on field of use and characteristic curve of the particular temperature sensor, as many reference elements as desired can be applied, in such a manner that an exact calibration and/or validation is enabled over the total temperature range of the temperature sensor, or in such a manner that the respective phase transition temperatures are matched to the particular application.

According to the invention, the at least two reference elements are contacted via exactly two connection wires. In this way, an especially simple construction of the respective apparatus results, and, associated therewith, a clearly smaller susceptibility to error in comparison to more complicated structures. This relates not only to the construction, but also to the performing of the respective calibration and/or validation, such as in connection with the method of the invention still to be explained.

Advantageously, at least one of the at least two materials, present especially in the form of a solid body, is a ferroelectric material or a ferromagnetic material.

A ferroelectric material, also called just a ferroelectric, is a material, which, below a material-specific ferroelectric Curie temperature, can have an electrical polarization, even in the absence of an electrical field. This phenomenon can be observed only in the case of crystal structures, in the case of which the formation of a polar axis is possible. In the case of exceeding the ferroelectric Curie temperature, a phase transition from the ferroelectric into the paraelectric state, or vice versa, takes place, which is accompanied with the disappearance or the forming of a polarizing of the material. In the case of such a phase transition, then, for example, a distinctive course of the dielectric constant as a function of temperature can be observed, which can be taken into consideration for calibration and/or validation of the temperature sensor. Similar behavior is found in the case of a ferromagnetic material. At the so-called Curie temperature, a phase transition from the ferromagnetic into the paramagnetic state, or vice versa, takes place, wherein a magnetization of the material, in each case, disappears above the Curie temperature.

According to the invention, thus, a calibration and/or validation of a temperature sensor by means of at least two reference elements integrated into a thermometer is provided, each of which reference elements has at least one characteristic temperature, thus a material-specific fixed point temperature (e.g. the Curie temperature or ferroelectric Curie temperature). Based on these temperatures, the actual temperature sensor can be regularly recalibrated—e.g the deviation of its output from the material-specific fixed point temperatures ascertained. Advantageously of concern, in such case, is a multipoint calibration, wherein the phase transition temperatures are optimally matched to the characteristic curve of the temperature sensor in reference to the desired application.

In contrast to the state of the art, thus not one, often only limitedly known, temperature specific characteristic curve change of a reference element is determined and evaluated, but, instead, deviations of a number of material-specific characteristic temperature points. Arising characteristic curve changes of the temperature sensor can, in this way, be exactly, completely and reproducibly detected and documented via such a multipoint calibration, even over a longer period of time. Building on this, an automatic self validating and drift prediction of the temperature sensor element can be implemented. Both the particular multipoint calibration based on the fixed point temperatures as well as also, in given cases, a therefrom derived validation and/or aging monitoring of the thermometer, particularly of the temperature sensor, can be provided for this purpose in an evaluating electronics, such as, for example, a temperature transmitter.

When the particular material is additionally present in the form of a solid body, an especially simple integration of the reference elements into the thermometer is possible, since no separately encapsulated cell or the like is necessary. Furthermore, the response of the temperature sensor to temperature changes is not degraded.

Advantageously, at least one of the at least two materials is doped with foreign atoms, especially in order to influence the phase transition temperature and/or the forming of domains.

Furthermore, at least one of the two materials can have a change at least one material-specific property at a characteristic temperature, which is not a phase transition temperature. For example, a ferroelectric material can also have a change of crystal structure independently of the ferroelectric Curie temperature and, associated therewith, a change of electrical, dielectric or volumetric properties. In the case of barium titanate, this is the case, for example, also at temperatures of about −90° C. and about 5° C.

In an embodiment, at least one phase transition in at least one of the at least two materials leads to a change of crystal structure and/or to a volume change and/or to a change, especially an abrupt change, of dielectric or electrical properties of the material. This property is then taken into consideration for calibration and/or validation.

Advantageously, at least one phase transition in at least one of the at least two materials is accompanied by a change from a paramagnetic to a ferromagnetic, from a ferromagnetic to a paramagnetic, from a ferroelectric to a paraelectric and/or from a paraelectric to a ferroelectric state.

Preferably, the phase transition, especially the change of the at least one physical and/or chemical property associated therewith, represented by a physical or chemical variable of the material characterizing this property, occurs jump like at the respective phase transition temperature. This manifests itself, for example, in a step-like curve of this variable as a function of temperature in the region of the phase transition temperature. In such case, it is to be noted that, in given cases, a hysteresis of the variable occurs.

In a preferred embodiment of the apparatus, the temperature sensor and the at least two reference elements are arranged in a single sensor head. Besides an especially compact construction, such an arrangement of temperature sensor as well as the at least two reference elements essentially means that they are exposed to the same (room-) ambient temperature, since the sensor head is the part of the thermometer, which is exposed to the environment of the thermometer, whose temperature is to be measured. This is useful especially as regards the preferred application of the thermometer.

An apparatus of the invention can be used in, among other places, industrial plants of the foods industry or plants, in which pharmaceutical products are produced, and/or sterilization methods such as Clean-In-Place, in short, CIP, or Steam-In-Place, in short, SIP. In the case of these methods, sterilization is performed in part with hot steam or water with a temperature between 120° C. and 140° C. This process can be applied for calibrating the thermometer, when, for example, at least one reference element of barium titanate with a ferroelectric Curie temperature of 125° C. is applied.

Another especially preferred embodiment provides that the at least two reference elements, which are embodied especially strip shaped, are arranged along an imaginary horizontal axis next to one another in the form of a total reference element, which is provided in the region of at least one, or in the region of two, oppositely lying faces parallel to the imaginary horizontal axis at least partially with an electrically conductive, especially metal, coating, in such a manner that the coating at least partially covers each of the at least two reference elements. In the case of this especially compact construction, the at least two reference elements are connected electrically in parallel.

Alternatively, the at least two reference elements can, however, also be connected in series.

Advantageously in the case of this embodiment, the total reference element and temperature sensor are arranged essentially directly next to one another or on top of one another, wherein at least one at least partially coated first face of the total reference element is smaller than a first face of the temperature sensor facing the total reference element and bordering on the total reference element, wherein a first connection wire for contacting the total reference element is attached in the region of the first face of the total reference element, and wherein a second connection wire is attached to the first face of the temperature sensor.

Alternatively and likewise advantageously, the at least one at least partially coated face of the total reference element is embodied in such a manner that at least a first and a second portion are coated, which two portions are insulated from one another by an electrically insulating dividing layer, wherein at least the two portions at least partially cover each of the at least two reference elements.

In an additional embodiment of the apparatus, at least the first and the second phase transition temperatures differ by at least 1K.

For the particular embodiment of a reference element, a number of solutions are possible.

For example, at least the total reference element can form at least one capacitor element with at least two dielectrics, wherein each of the at least two dielectrics has at least one phase transition of second order. Then, for example, an often jump like change of the dielectric properties of at least one reference element can be detected via the corresponding change of its electrical capacitance. In such case, the measuring of the capacitance can be performed according to a measuring principle known from the state of the art. The geometric embodiment of the at least one capacitor element and/or the electrode arrangement are relatively freely selectable. Options include e.g. an embodiment in the form of a plate capacitor or as a cylinder.

Alternatively, at least the total reference element can serve as a substrate for the temperature sensor, especially for a temperature sensor in the form of a resistance element. Especially, temperature sensor and at least one of the at least two reference elements can be arranged on a single substrate. In this case, for example, volume changes associated with a phase transition are detected by noting a characteristic change of the ohmic resistance of the resistive structure. Such a resistance element can, furthermore, be provided with a metallizing layer on the substrate lower face. In this case, measurements of the ohmic resistance as well as measurements of the capacitance can be simultaneously performed. Especially, the temperature sensor can be united with at least one reference element in a sensor construction in such a manner that they are essentially exposed to the same (ambient-)temperature. The resistance element can be embodied, for example, as a PT100 and be utilized as sensor for measuring temperature. The capacitance measurement of the capacitor element can then serve for determining the phase transition temperature and/or as a calibration reference for the resistance element.

In the case, in which the total reference element is composed of at least two ferroelectric materials, it can be of advantage that at least one voltage can be applied for polarizing the first and/or second material. The apparatus includes corresponding means for such purpose. In the case of ferroelectric materials, such as, for example, barium titanate ($BaTiO_3$), lead zirconate titanate (LZT), strontium bismuth tantalate ($SrTiO_3$) or also mixtures of the last two, there occur in the case of thermally induced phase transitions length changes of the lattice constants, which, in turn, bring about directed changes of the volume of the substrate and strain- and upset effects in the applied thin films. By applying an electrical voltage, temperature dependent, and, in given cases, hysteretic volume changes or a piezoelectric effect can be brought about. Moreover, for influencing the phase transition at a temperature near the phase transition temperature, an electrical voltage can be applied for causing length changes in the order of magnitude of up to 1%, preferably up to 0.1%, of the length of the substrate. With such an applied voltage, the position of the phase transition temperature can be influenced.

As regards the method, the object of the invention is achieved by a method for in situ calibration of an apparatus of the invention, comprising at least method steps as follows:

ascertaining for at least one of the reference elements at least one phase transition point in time, at which at least one phase transition temperature is achieved, ascertaining, as measured by means of the temperature sensor, a temperature measured value measured at a measuring point in time, which has the shortest time separation from the phase transition point in time, calibrating the temperature sensor based on a comparison of the at least one phase transition temperature with the temperature measured value.

The phase transition point in time is detected especially based on the change, especially abrupt change, of the at least one physical and/or chemical property accompanying the phase transition, which is characterized by a physical or chemical variable characterizing such property. The particular characteristic physical or chemical variable is, for example, recorded, e.g. plotted, as a function of time, wherein the exact point in time of the phase transition can be determined from the curve.

In parallel with this, the temperature measured values measured by means of the temperature sensor are likewise recorded as a function of time. Then, directly in an on-site evaluating electronics of the thermometer, or at a later point in time, or also in a remote evaluation unit, that temperature measured value can be ascertained, which best matches the moment of the respective phase transition and, thus, can be taken as one of the known fixed point temperatures. In such case, the temperature measured value measured at that point in time is that, which has the shortest time separation from the phase transition point in time. Because the at least two reference elements are contacted by means of exactly two connection wires, also the contacting of the reference elements to the evaluating electronics is especially simply implementable. Since each of the at least two reference elements is contacted via the same connection wires, there is no need especially within the evaluating electronics for means for distinguishing between the different reference elements.

Finally, the calibration and/or validation of the temperature sensor, i.e. of the thermometer, occurs by determining the difference between this temperature measured value and the relevant phase transition temperature. A correction of the characteristic curve of the temperature sensor, a statement of the uncertainty of the measuring or a statement of a characteristic curve drift over a defined time range, or its history, are likewise possible. Thus, likewise a state monitoring of the temperature sensor, i.e. of the thermometer, is possible.

Advantageously, the at least one phase transition point in time is detected based on a change of crystal structure, and/or a volume change and/or a change, especially an abrupt change, of dielectric or electrical properties of at least one of the materials of at least one of the reference elements.

Likewise advantageously, the temperature measured values ascertained by means of the temperature sensor and/or the change of crystal structure, and/or the volume change and/or the change, especially abrupt change, of dielectric or electrical properties of a material are recorded as a function of time.

An especially preferred embodiment of the method provides that based on a comparison of the at least one phase transition temperature with the temperature measured value measured essentially at the same time, it is detected, which of the at least two reference elements passed through a phase transition. In this case, phase transition temperatures of the at least two reference elements differ preferably by at least 1K. By comparing the respective temperature measured values with the respective known phase transition temperatures, it can be clear, to which of the at least two reference elements a phase transition is to be attributed.

In an additional embodiment of the method, the temperature sensor and the at least the two reference elements are exposed essentially to the same ambient temperature. In this case, a very good thermal coupling of the at least two reference elements is required. Of course, in the case of rapid temperature changes, different reference elements can at least temporarily also have different temperatures. In this case, an evaluating electronics can, for example, register temperature gradients as a function of time. If the influence of the different response times to the rapid temperature change affects the desired accuracy of the calibration and/or validation, then the calibration can be rejected. Furthermore, from the recorded temperature values as a function of time, the values agreeing best with the different phase transition temperatures can be extracted. If these deviate, in turn, too strongly from the phase transition temperatures, such can be attributed to poor thermal coupling of the reference elements.

In an additional embodiment of the method, the apparatus is heated or cooled, in order to induce at least one phase transition in at least one material at its phase transition temperature. The heating or cooling of the thermometer, especially of the portion of the thermometer, in which temperature sensor and at least one of the at least two reference elements are located, can, in such case, be achieved either by providing a heating element or from the process. For such purpose, for example, a CIP- or SIP process in a plant can be utilized.

The embodiments explained with regard to the apparatus can be applied mutatis mutandis also for the proposed method.

BRIEF DESCRIPTION OF THE DRAWINGS

The invention will now be explained in greater detail based on the appended drawing, the figures of which show as follows.

DETAILED DESCRIPTION

Figure 1:
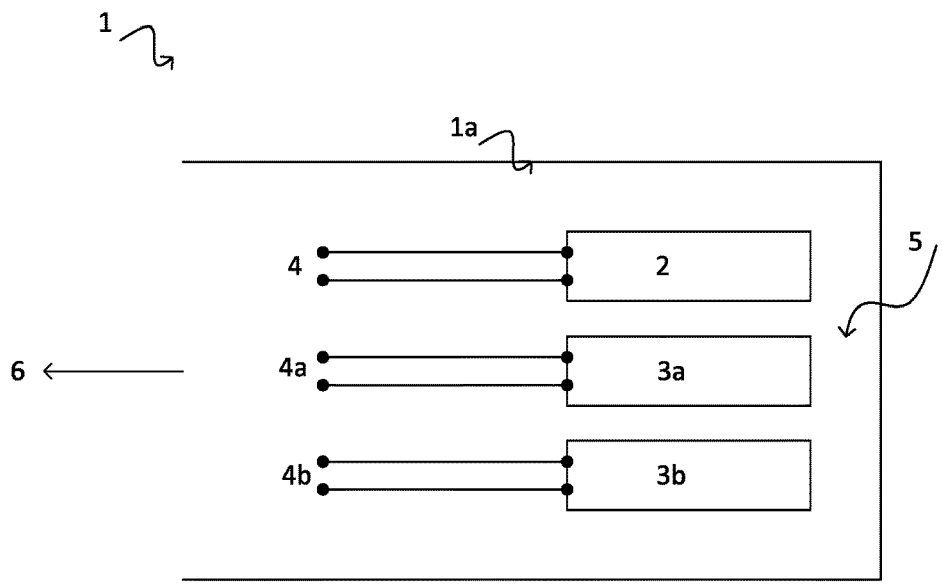
FIG. 1 shows a schematic representation of a thermometer having two separately contacted reference elements.

FIG. 1 is a schematic view of a thermometer 1 and a thermometer insert, with a temperature sensor 2 as well as two reference elements 3a and 3b. The temperature sensor 2 can be, for example, a resistance element, while the two reference elements 3a,3b can be, for example, capacitor elements. In this example, temperature sensor 2 is contacted by means of two connection wires 4, for example, for supplying the temperature sensor with an electrical current and for tapping a measurement voltage. It is to be noted here, however, that also so-called four-conductor-technology can be applied. In the example shown here, furthermore, the first reference element is 3a contacted via two connection wires 4a and the second reference element 3b via two connection wires 4b.

Temperature sensor 2 as well as the two reference elements 3,3a are arranged together in a sensor head 1a, for example, forming part of a protective tube, and affixed in its tip by means of an electrically insulating material 5. Thus, temperature sensor 2 as well as the two reference elements 3a,3b are essentially exposed to the same ambient temperature. In this way, dynamic and/or static measurement errors can be minimized.

Not shown in FIG. 1 is a temperature transmitter, which can likewise be integrated therein, for example, attached to the sensor head 1a, and which can serve for producing temperature measured values of the temperature sensor 2 and/or references signals of the reference elements 3a,3b, which reference signals in the case of reference elements embodied as capacitor elements can be, for example, the capacitances. Such a temperature transmitter can, for example, also contain an evaluating electronics 6. Such can be implemented as separate evaluating electronics 6 for temperature sensor 2 and for each reference element 3a,3b, or also a single shared evaluating electronics 6 can be used. Sensor head 1a, or the protective tube, can, furthermore, have a process connection, via which it can be connected, for example, to a container, such as a pipe or a tank.

Figure 2A:
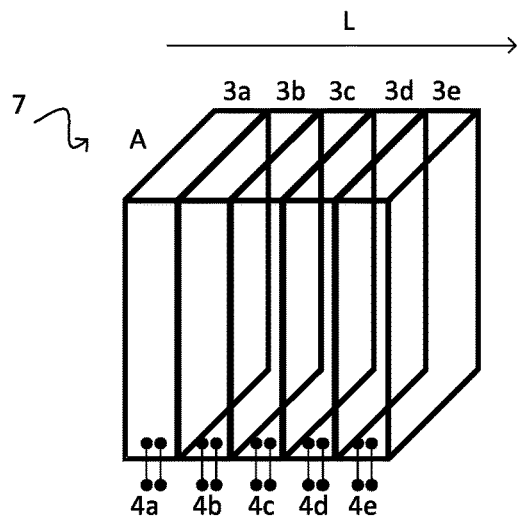
FIG. 2 shows three possible embodiments for a total reference element constructed of five reference elements.

FIG. 2a shows schematically a total reference element 7, which is composed of five strip shaped reference elements 3a, 3b,3c,3d, 3e, which are arranged next to one another along the horizontal axis L and each of which is contacted via two connection wires 4a,4b,4c,4d,4e. Evident from this schematic representation is the high constructional effort that goes along with such an apparatus.

Figure 2B:
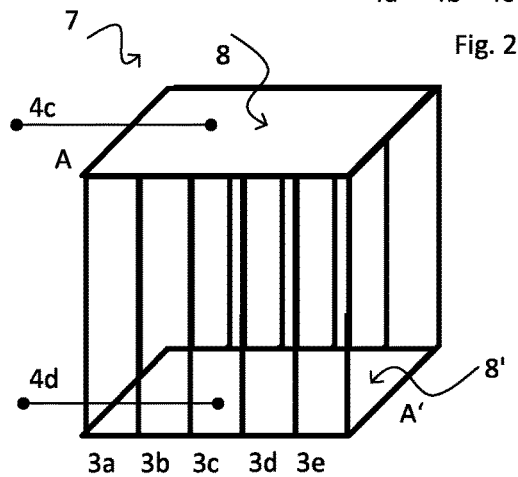

In order to contact such a total reference element 7 by means of exactly two connection wires 4c and 4d, the total reference element 7 is provided on at least one face A,A' parallel to horizontal axis L at least partially with an electrically conductive coating 8,8', especially a metal coating. Such a variant for a total reference element 7 is shown in FIG. 2b, wherein the total reference element is provided here with the electrically conductive coating 8,8' on the two oppositely lying faces A and A'. Connected to each of these coatings 8,8' is then a connection wire 4c, 4d for contacting the total reference element 7. Of course, a corresponding face A,A' can also only be partially coated.

However, the coating 9,9' should at least partially cover each of the reference elements 3a,3b,3c,3d,3e.

Figure 2C:
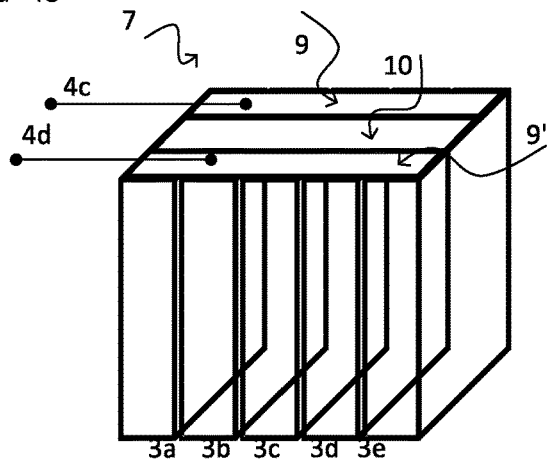

Another opportunity for embodying a total reference element 7 in such a manner that it can be contacted by means of exactly two connection wires 4c,4d, is, finally, shown in FIG. 2c. In this case, a first portion 9 and a second portion 9' of the face A are coated with an electrically conductive, especially metal, coatings. These coatings of the two portions 9,9' are insulated from one another by a dividing layer 10 extending between them. In this case, the two connection wires 4c,4d can be contacted from the face A. Independently of the exact geometric dividing of the face A into two coated portions 9,9' and a dividing layer 10, it should be assured that each portion 9,9' as well as the dividing layer at least partially covers each of the reference elements 3a,3b,3c,3d, 3e. Instead of a dividing layer 10, a portion of the face A corresponding to the dividing layer can also remain uncoated.

Figure 3:
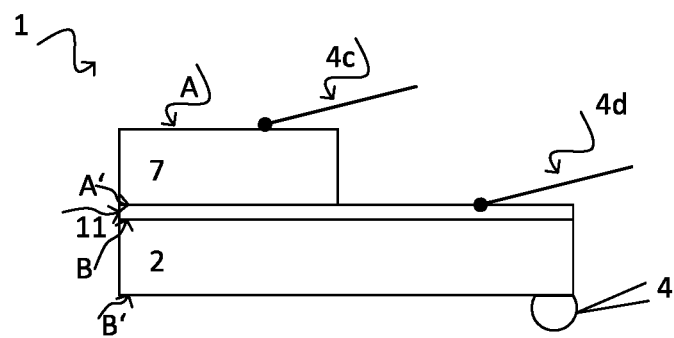
FIG. 3 shows a schematic representation of a thermometer with a temperature sensor and a total reference element contacted by means of two connection wires.

FIG. 3 shows, finally, a thermometer 1, or thermometer insert, with a total reference element 7 with at least one coated face A and a temperature sensor 2 in the form of a resistance element. The total reference element 7 and temperature sensor 2 have different geometries and are arranged directly on top of one another. The first face A of the total reference element 7, coated such as in the case of the example of FIG. 2b, is smaller than a first face B of the temperature sensor 2 facing the total reference element and bordering on the total reference element.

The total reference element is coated in the region of the face A and electrically contacted by means of a first connection wire 4c. Via a metallizing 11, the total reference element 7 and temperature sensor 2 are, moreover, connected with one another and thermally coupled in such a manner that the face A' of the total reference element 7 and the face B of the temperature sensor lie directly opposite one another. The metallizing can be produced especially via a solder- or sinter process. Furthermore, the face A' in this example of an embodiment can optionally likewise be coated. The second connection wire 4d for contacting the total reference element is in this example, finally, attached in the region of the metallizing 11 on the first face B of the temperature sensor 2. Temperature sensor 2 is, in contrast, contacted via connection wires 4, which are connected on the face a of the temperature sensor 2. In this example, connection wires 4 are soldered to the temperature sensor 2.

Figure 4:
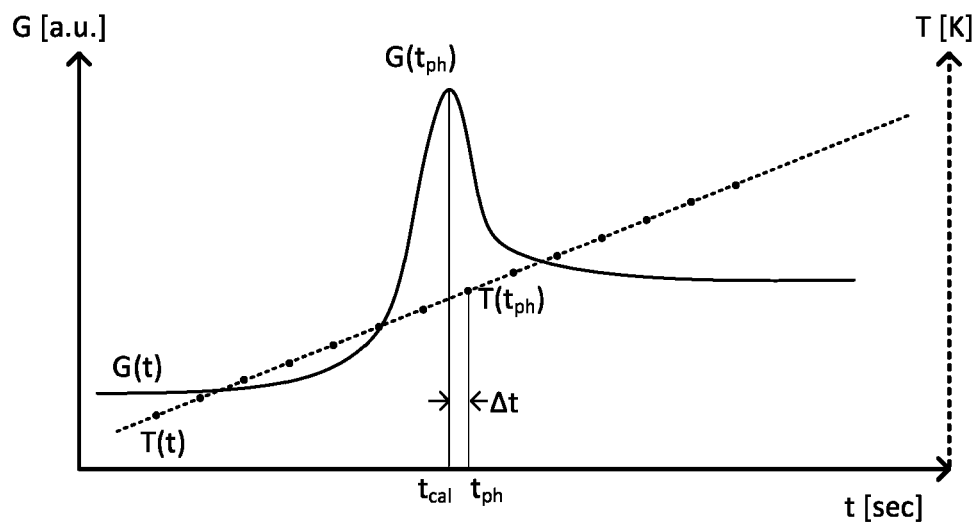
FIG. 4 shows a schematic representation of the curve of a reference element variable characteristic for a phase transition as well as temperature measured values measured by means of a temperature sensor, each as a function of time.

For illustrating the method of the invention, FIG. 4 shows, schematically, the curve of a variable G characteristic for a phase transition in arbitrary units (a.u.) for at least one reference element 3 as well as the temperature measured values T in Kelvin measured by means of the temperature sensor 2, each as a function of time, thus G(t), T(t). The phase transition is detected based, for example, on a change of crystal structure, and/or a volume change and/or a change, especially an abrupt change, of dielectric or electrical properties of at least one of the materials of at least one of the reference elements. The characteristic variable can then be, for example, the dielectric constant ε in the case of a reference element embodied as a capacitor element.

The particular variable G of the relevant reference element 3 passes at the phase transition point in time $t_{ph}$ through a phase transition at a phase transition temperature $T_{ph}$, which is accompanied by an abrupt change of variable G at such point in time $G(t_{ph})$. For calibration and/or validation of the temperature sensor 2, that temperature measured value $T(t_{cal})$ is ascertained, which was measured at a measuring point in time $t_{cal}$, which has the shortest time separation Δt from the phase transition point in time $t_{ph}$. From a comparison, especially by the forming the difference, of the phase transition temperature $T_{ph}$ with the temperature measured value $T(t_{cal})$, then the calibration and/or validation can be performed.

The invention claimed is:

1. An apparatus for determining and/or monitoring a temperature of a medium, comprising:
   at least one temperature sensor; and
   at least two reference element for in situ calibration and/or validation of the at least one temperature sensor,
   wherein a first reference element is composed at least partially of a first material having at least one phase transition of at least second order at at least a first predetermined phase transition temperature in a temperature range relevant for the calibration of the at least one temperature sensor, and
   wherein a second reference element is composed at least partially of a second material having at least one phase transition of at least second order at at least a second predetermined phase transition temperature in the range relevant for calibration of the at least one temperature sensor, and
   wherein the at least two reference elements are arranged along a horizontal axis, side-by-side in the form of a total reference element, wherein said total reference element is provided at least in part with an electrically conductive coating in the area of at least one lateral surface or in the area of two opposite lateral surfaces parallel to the imaginary horizontal axis such that the coating covers each of the at least two reference elements at least in part, and the total reference element is contacted via exactly two connecting wires.

2. The apparatus as claimed in claim 1, wherein at least the first material or the second material is a ferroelectric material or a ferromagnetic material.

3. The apparatus as claimed in claim 1, wherein at least one phase transition in the first material or the second material causes a change of crystal structure and/or a volume change and/or an abrupt change of dielectric or electrical properties of the material.

4. The apparatus as claimed in claim 2, wherein at least one phase transition in the first material or the second material is accompanied by a change from a paramagnetic to a ferromagnetic, from a ferromagnetic to a paramagnetic, from a ferroelectric to a paraelectric and/or from a paraelectric to a ferroelectric state.

5. The apparatus as claimed in claim 1, wherein the temperature sensor and the at least two reference elements are arranged in a single sensor head.

6. The apparatus as claimed in claim 1, wherein the at least two reference elements are generally strip-shaped and are disposed along an imaginary horizontal axis next to one another, the at least two reference elements forming a total reference element, the apparatus further comprising:
a first electrically conductive, coating at least partially covering a first face of the total reference element that is parallel to the imaginary horizontal axis and contacting each of the at least two reference elements.

7. The apparatus as claimed in claim 1, wherein the total reference element and temperature sensor are disposed directly next to one another or on top of one another,
wherein the first face of the total reference element is smaller than a first face of the temperature sensor facing the total reference element and bordering on the total reference element,
wherein a first connection wire for contacting the total reference element is attached in the region of the first face of the total reference element and a second connection wire is attached to the first face of the temperature sensor.

8. The apparatus as claimed in claim 1, the apparatus further comprising a second electrically conductive coating at least partially covering the first face of the total reference element and contacting each of the at least two reference elements,
wherein the first electrically conductive coating and the second electrically conductive coating are insulated from one another by an electrically insulating dividing layer.

9. The apparatus as claimed in claim 1, wherein at least the first predetermined phase transition temperature and the second predetermined phase transition temperature differ by at least 1K.

10. A method for in situ calibration of a temperature monitoring apparatus, comprising:
providing the temperature monitoring apparatus, including:
at least one temperature sensor; and
at least two reference elements for in situ calibration and/or validation of the at least one temperature sensor,
wherein a first reference element is composed at least partially of a first material having at least one phase transition of at least second order at at least a first predetermined
phase transition temperature in a temperature range relevant for the calibration of the at least one temperature sensor, and
wherein a second reference element is composed at least partially of a second material having at least one phase transition of at least second order at at least a second predetermined phase transition temperature in the range relevant for calibration of the at least one temperature sensor, and
wherein the at least two reference elements are arranged along a horizontal axis, side-by-side in the form of a total reference element, wherein said total reference element is provided at least in part with an electrically conductive coating in the area of at least one lateral surface or in the area of two opposite lateral surfaces parallel to the imaginary horizontal axis such that the coating covers each of the at least two reference elements at least in part, and the total reference element is contacted via exactly two connecting wires,
ascertaining at least one phase transition point in time at which at least one phase transition temperature is achieved for at least one of the at least two reference elements;
ascertaining a temperature measured value measured using the temperature sensor at a measuring point in time which has the shortest time separation from the phase transition point in time; and
calibrating the temperature sensor based on a comparison of the at least one phase transition temperature with the temperature measured value.

11. The method as claimed in claim 10, wherein the at least one phase transition point in time is ascertained based on a change of crystal structure and/or a volume change and/or a change of dielectric or electrical properties of at least one material of at least one of the at least two reference elements.

12. The method as claimed in claim 11 wherein the temperature measured values ascertained using the temperature sensor and/or the change of crystal structure and/or the volume change and/or the change of dielectric or electrical properties of the at least one material are recorded as a function of time.

13. The method as claimed in claim 12, further comprising:
detecting which of the at least two reference elements passed through a phase transition based on a comparison of the phase transition temperature with a temperature measured value measured essentially at the same time.

14. The method as claimed in claim 10, wherein the temperature sensor and the at least two reference elements are exposed to the same ambient temperature.

15. The method as claimed in claim 10, further comprising:
heating or cooling the apparatus to induce the phase transition.

* * * * *